Jan. 6, 1953   J. LAST   2,624,563

WEIGHING APPARATUS

Filed June 7, 1947   2 SHEETS—SHEET 1

INVENTOR.
James Last
BY Kenway & Witter
his attys.

Jan. 6, 1953  J. LAST  2,624,563
WEIGHING APPARATUS
Filed June 7, 1947  2 SHEETS—SHEET 2

INVENTOR.
James Last,
BY Kenway & Witter
his Attys.

Patented Jan. 6, 1953

2,624,563

UNITED STATES PATENT OFFICE 2,624,563

WEIGHING APPARATUS

James Last, Letchworth, England

Application June 7, 1947, Serial No. 753,263
In Great Britain November 1, 1944

Section 1, Public Law 690, August 8, 1946
Patent expires November 1, 1964

6 Claims. (Cl. 265—27)

This invention relates to improvements in weighing apparatus and one object of the invention is to provide weighing apparatus in which the attainment of the selected weight is indicated in an obvious manner, the same for all weights, by means not involving the scrutiny of the alignment of an index finger, or any other precision observation of equilibrium.

Another object of the invention is to provide weighing apparatus in which the attainment of selected smaller weights is indicated with as great a proportionate accuracy as that of relatively larger weights.

Accordingly, the invention consists in weighing apparatus, comprising a scale pan, a counterpoise member operatively connected to the scale pan and a member operatively connected to the foregoing system for abruptly modifying the equilibrium of the system when the load in the scale pan has reached a predetermined value.

Various ways of carrying the invention into effect are shown in the accompanying drawings, in which.

Figure 1:
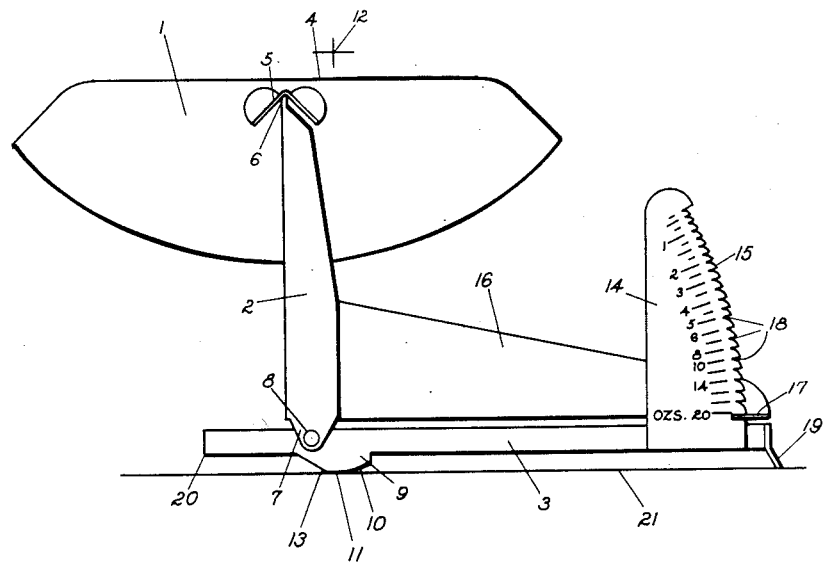
Fig. 1 is an elevation of a simple embodiment of the invention.
Figure 2:
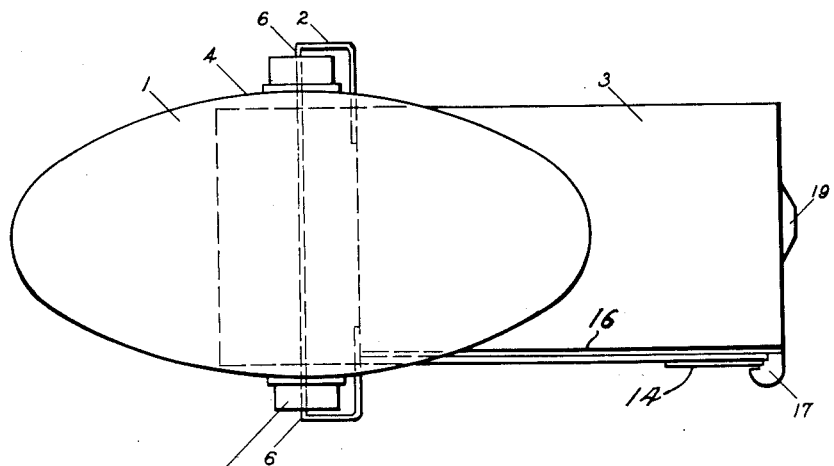
Fig. 2 is a plan view.

Referring to Figs. 1 and 2, a simple embodiment of the invention comprises three main elements, the scale pan 1, a yoke 2 and a base 3 to which the yoke is transversely pivoted, the two latter elements constituting the system supporting the scale pan.

In this embodiment the scale pan 1 is shaped somewhat as a double ended scoop, the middle portion of each of its side walls being formed as a broad lug 4 extending above a horizontal axis situated above the center of gravity of the pan and transverse to its length. To the outside of each lug 4, above the said diameter is fixed an inverted V notch 5, the apices of the V's being co-linear and parallel to the said axis.

The scale pan 1 rests, by means of the aforesaid V notches 5, on a pair of transversely co-linear knife edges 6 formed at the upper part of the yoke member 2, thus providing an axis upon which the scale pan 1 may swing to bring the center of gravity of its load beneath the said axis.

The pan 1 is supported upon the V notches 5 resting on the yoke 2, two lugs 7 depending from the yoke 2 to embrace the edges of the base member 3, a pivot bar 8 passing horizontally through both lugs 7 and the base member 3.

The base member 3 is a flat, inverted rectangular tray, the above mentioned yoke pivot 8 passing through both its down-turned side flanges. At its other end a small lug 19 extends a little way down from the center of its end flange.

A pair of shallow lugs 9 extend downwards, their lower edges furnishing two alternative fulcra, these edges being made of arcuate form such that when the structure is resting on the three points, provided by the end lug 19, just described, and these two side lugs 9, the arcuate edges 10 of the latter having their geometrical center at an axis 12, representing one of the fulcra, make contact on a suitable supporting surface 21 at points 11 somewhat nearer to the end lug 19 than are the ends 13 of the side lugs 9 remote from the said end lug. The ends of the side lugs 9, just referred to, are shaped with an arc 13, of small radius, conjunct with the form of the supporting arcuate lower edges 10, the centers of these small arcs 13 being on a common pivotal axis representing the remaining fulcrum, for the whole structure, alternative to that furnished by the axis 12 of the arcuate lower edge 10, as more fully described later.

At a position on one side flange of the base member 3, an arcuate index member 14 is attached, its arcuate edge 15 being concentric with the yoke pivot 8. This edge is V-notched and a transversely resilient arm 16 extends from the yoke 2, such as to be capable of swinging the yoke 2 about its pivot 8 or, when locked to the index member 14, of retaining the yoke 2 in a selected angular adjustment with respect to the base member 3.

The locking of the said arm 16 is performed by providing it with a V-shaped tongue 17 which engages with a selected notch in the index member 14 when the arm 16 is released, but which may disengage from the notch by deflecting the arm. The notches 18 are positioned so as to define adjustments of the yoke 2, corresponding to the scale of weights embraced within the compass of the index member and enumerated thereon.

Consideration will show that the adjustment at the upper end of the index member 14, for lighter weights, is substantially coarser than at the lower end, for heavier weights.

The base member 3 constitutes the main part of the mass of the constant counterpoise and cooperating therewith is the arm 16 which constitutes the variable counterpoise, the combined elements 3 and 16 comprising the compound counterpoise mass or member. The index member 14 carried by the base 3 is included as part of the counterbalancing mass comprising the counterpoise member. With a given adjustment of the yoke 2, as defined by the index member 14 and the resilient arm 16 of the yoke, the initial arm of the moment, due to a load in the scale pan 1 on the yoke knife edge 6, is determined.

At some instant, as material is loaded into the scale pan, the end lug 19 will rise from the supporting surface and the structure will be supported on the arcuate edges 10 alone, but still in stable equilibrium, the virtual pivot being the axis 12 of the arcuate edges, which is above the whole structure, the arm of the moment due to the counterpoise increasing somewhat and that due to the load in the scale pan similarly decreasing, both their centers of gravity being below the virtual pivot 12.

The loading of further material is counterbalanced by the further increasing moment due to the counterpoise and the further decreasing of the arm of the moment due to the load and is accompanied by the travel, away from the end lug 19, of the perpendicular through the axis 12 and the points of contact of the arcuate edges with their supporting surface, until, on the loaded material attaining the weight selected by the adjustment of the yoke, the points of contact travel on to the terminal arcs 13 of small radius and the axle 12 is over the axis of the arcs 13. On this, the equilibrium becomes unstable and the end flange 20 of the base comes down on to the supporting surface in a single abrupt movement, the dimension of which is constant for all adjustments of the yoke.

Figure 3:
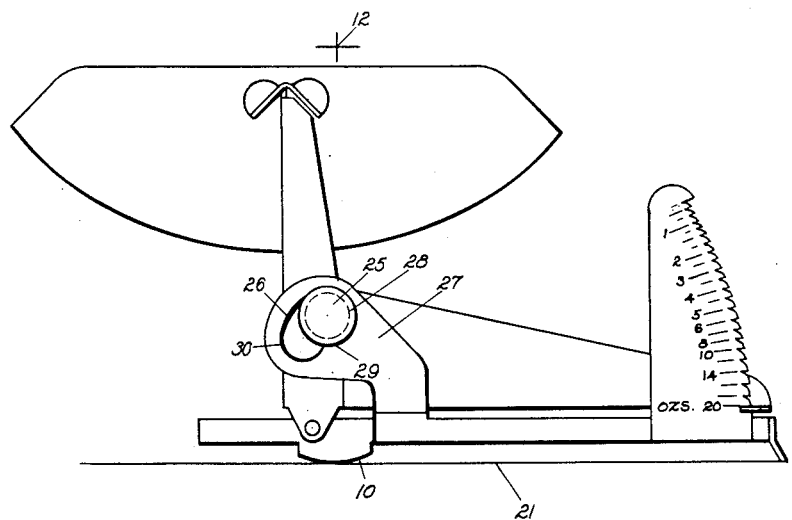
Fig. 3 shows a modification employing a rolling tumbler.

In a modification of this embodiment, shown in Fig. 3, the arcuate edges 10 of the supporting lugs are extended, the arcs of small radius being omitted, and the indicative change of equilibrium being produced by a roller 25 in a kidney shaped slot 26 in a bracket 27 extending upwards from the base and situated approximately above one of the supporting lugs. The slot 26 is so shaped that the roller 25 rests in a semi-circular formed end 28 of the slot, the diameter of which is substantially normal to the base 3, until the predetermined load is in the scale pan, when the roller 25 rolls out of the semi-circular form 28 over a re-entrant 29 in the lower wall of the slot into the lower lobe 30, thus adding a moment, due to the mass of the roller 25, to that due to the load in the scale pan and causing an abrupt depression of the pan, to indicate that the predetermined load has been reached.

Figures 4, 5:
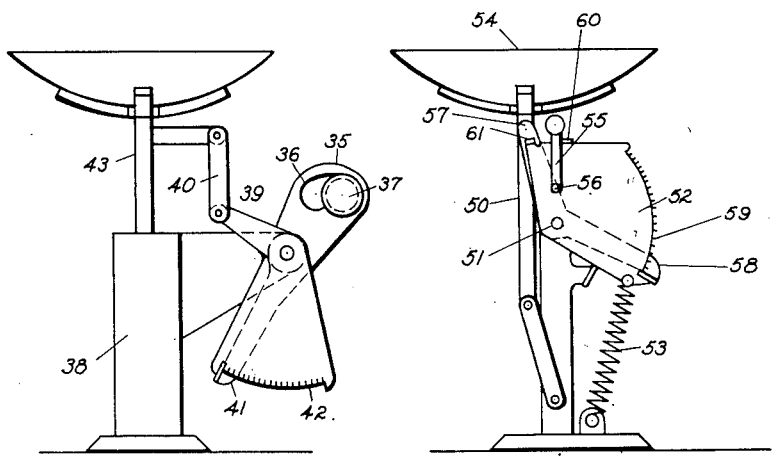
Fig. 4 shows the invention applied to a conventional spring scale.
Fig. 5 shows the invention applied to a scale with a spring counterpoise having a uniform deflection for varying loads in the scale pan.

In applying the invention to apparatus of the pedestal spring balance type shown in Fig. 4, a swinging member 35, provided with a slot 36 of the shape described above and similarly containing a roller 37, is pivoted to the pedestal 38, the slot being substantially above the pivot, and linked by an arm 39 and link 40 to the scale pan support. Adjustment between the portion containing the slot 36 and the scale pan support 43, is provided by means of the resilient arm 41 which is of the character of the arm 16, Fig. 1, and notched sector 42, to cause the fall of the roller to occur at various deflections of the spring and corresponding loads in the scale pan.

In an embodiment shown in Fig. 5 in which the scale pan support 50 is adjustable with respect to the fulcrum 51, to vary the arm of the moment about the fulcrum due to the load in the pan, the variation is provided for by the arm 57 supporting the pan being integral with the resilient arm 58, variably engaging the notched sector 59 of the member 52. The member, 52, may be coupled to a spring counterpoise 53 which in this case will then have a deflection constant for all loads to the point of attaining the predetermined load in the scale pan 54, the roller and slot construction above described being replaced by a tumbler device 55 pivoted at 56 on the member 52 and, by swinging away from the lug 60 and falling on to its alternative stop 61, on the member 52, thereby abruptly disturbing the equilibrium of the system, serving to indicate when this point has been reached. A weight may be substituted for the spring in this embodiment of the invention.

In all forms of the invention illustrated the scale pan is supported substantially above the fulcrum axis and at the side thereof opposite to the counterbalancing mass. The counterbalancing mass supports the pan in stable equilibrium on the fulcrum during pivotal movement of the counterpoise member from its position of maximum stable equilibrium to the position of unstable equilibrium. At this latter position the mass functions together with the means at 13 (Fig. 1), 29 (Fig. 3) etc. to cause abrupt and continued further pivotal movement of the counterpoise member from the position of unstable equilibrium to its maximum position of movement in the same direction. The predetermined load required to bring the counterpoise member to the position of unstable equilibrium can be varied as above described.

Having now disclosed my invention what I claim as new and desire to secure by Letters Patent of the United States is:

1. Weighing apparatus comprising a scale pan, a counterpoise member, a fulcrum supporting the counterpoise member for pivotal movement about a horizontal axis, means supporting the pan on said member wholly above and at one side of the fulcrum, the counterpoise member including a counterbalancing mass connected thereto and continuously carried thereby at the other side of the fulcrum and operative together with the counterpoise member to support the pan in stable equilibrium on said fulcrum during pivotal movement of the member from its position of maximum stable equilibrium to a position of unstable equilibrium, means for causing an abrupt and continued further pivotal movement of the member in the same direction from said position of unstable equilibrium when the load in the pan equals a predetermined load, and means for relatively adjusting the mass and counterpoise member to vary the predetermined load.

2. The weighing apparatus defined in claim 1 in which the first named means comprises a yoke pivoted to the counterpoise member on an axis parallel with the axis of said fulcrum and supporting the pan in balanced equilibrium above said axis, and wherein the adjusting means includes an arm rigid with the yoke and adjustable therewith relative to the counterpoise member about the yoke axis.

3. The weighing apparatus defined in claim 2 in which the counterpoise member includes a relatively long and rectangular base extending laterally from the fulcrum at said other side thereof and adapted to rest horizontally on a support and pivot therefrom on said fulcrum, said fulcrum being disposed beneath said arm wholly at one side of a vertical plane passing through the yoke axis and providing no support for the member directly beneath and at the other side of the yoke axis.

4. The weighing apparatus defined in claim 1 in which said mass includes a weight carried by and connected to the counterpoise member and movable by gravity laterally and transversely of the fulcrum axis relative to said member to cause said abrupt pivotal movement of the counterpoise member when the load in the pan equals the predetermined load.

5. The weighing apparatus defined in claim 1 plus a base on which the counterpoise member is pivoted for movement about a fixed axis and includes two portions one of which is adjustable relative to the other about said axis to vary the predetermined load.

6. The weighing apparatus defined in claim 5 in which said mass includes a weight carried by one of said portions above said axis and movable relative thereto by gravity to cause said abrupt pivotal movement of the counterpoise member when the load in the pan equals the predetermined load.

JAMES LAST.

REFERENCES CITED

The following references are of record in the file of this patent:

UNITED STATES PATENTS

| Number | Name | Date |
|---|---|---|
| 321,481 | Buie | July 7, 1885 |
| 564,946 | Simons | July 28, 1896 |
| 587,680 | McLeod | Aug. 3, 1897 |
| 921,170 | Scott | May 11, 1909 |
| 1,076,486 | Cummer | Oct. 21, 1913 |
| 1,185,634 | Cummer | June 6, 1916 |
| 2,433,575 | Niederer et al. | Dec. 30, 1947 |

FOREIGN PATENTS

| Number | Country | Date |
|---|---|---|
| 437,559 | Great Britain | Dec. 31, 1935 |
| 889,514 | France | Jan. 12, 1944 |